(12) United States Patent
Shih

(10) Patent No.: US 7,666,018 B2
(45) Date of Patent: Feb. 23, 2010

(54) ELECTRIC CARD CONNECTOR AND MANUFACTURING METHOD THEREOF

(75) Inventor: Hsien-Kuang Shih, Hsien Shi (TW)

(73) Assignee: K.S. Terminals Inc., Chang Hwa County (TW)

( * ) Notice: Subject to any disclaimer, the term of this patent is extended or adjusted under 35 U.S.C. 154(b) by 0 days.

(21) Appl. No.: 12/252,600

(22) Filed: Oct. 16, 2008

(65) Prior Publication Data
US 2009/0318030 A1  Dec. 24, 2009

(51) Int. Cl.
H01R 13/62 (2006.01)
(52) U.S. Cl. ..................................... 439/326
(58) Field of Classification Search ............... 439/326, 439/630
See application file for complete search history.

(56) References Cited

U.S. PATENT DOCUMENTS

| | | | |
|---|---|---|---|
| 5,733,147 A | 3/1998 | Verstijnen | |
| 6,305,960 B1 | 10/2001 | Fan | |
| 6,409,529 B1 | 6/2002 | Liu et al. | |
| 6,814,597 B1 | 11/2004 | Kao | |
| 6,974,343 B2 | 12/2005 | Zheng et al. | |
| 7,011,537 B1 | 3/2006 | Kijima et al. | |
| 7,112,075 B1 | 9/2006 | Su | |
| 7,118,419 B1 | 10/2006 | Lee | |
| 7,220,148 B2 | 5/2007 | Zhao et al. | |
| 7,232,326 B2 * | 6/2007 | Uchida et al. | 439/326 |
| 7,357,678 B1 | 4/2008 | Lee et al. | |
| 7,435,119 B2 * | 10/2008 | Chang et al. | 439/188 |
| 2002/0055291 A1 * | 5/2002 | Maiterth et al. | 439/326 |
| 2005/0070146 A1 * | 3/2005 | Lu | 439/326 |
| 2005/0221651 A1 * | 10/2005 | Natori | 439/326 |
| 2006/0166541 A1 * | 7/2006 | Uchida et al. | 439/326 |
| 2006/0270263 A1 * | 11/2006 | Hirata | 439/326 |
| 2008/0102680 A1 * | 5/2008 | Chang et al. | 439/326 |
| 2008/0124964 A1 * | 5/2008 | Chen | 439/326 |

* cited by examiner

*Primary Examiner*—Gary F. Paumen
(74) *Attorney, Agent, or Firm*—Ming Chow; Sinorica, LLC

(57) ABSTRACT

An electric card connector and a manufacturing method thereof are proposed. The electric card connector includes a base having a plurality of electrically conductive terminals, and a lid having a pair of arms formed at two sides thereof for holding an electric card. Pivot parts are provided at the two sides of the lid and hinge parts are formed on the base corresponding to the pivot parts so that when the lid lies on the base, the pivot parts are allowed to slide along the hinge parts without substantial spin. Tenons are formed at front ends of the arms and a latching portion is provided at a front end of the base corresponding to the tenons so that when the lid slides along the base to engage the tenons with the latching portion, the lid and base are mutually positioned and restricted from relative movement.

20 Claims, 13 Drawing Sheets

ELECTRIC CARD CONNECTOR AND MANUFACTURING METHOD THEREOF

BACKGROUND OF THE INVENTION

1. Technical Field

The present invention relates to an electric card connector and a manufacturing method thereof. More particularly, the present invention relates to an electric card connector provided in a mobile phone for holding a SIM card.

2. Description of Related Art

With the increasing demands for modern electronic devices, consumers require more and more from mobile electronic devices. An electric card (such as a SIM card) used in such mobile electronic devices therefore becomes a crucial product. Since an electric card may need to be frequently removed from, inserted into and connected with various mobile electronic devices, the modern electronic industry has paid more and more attention to the improvement in the design and configuration of existing electric card connectors.

Some prior disclosure about electric card connectors can be seen in U.S. Pat. Nos. 7,357,678; 7,220,148; 7,118,419; 7,112,075; 7,011,537; 6,974,343; 6,814,597; 6,409,529; 6,305,960 and 5,733,147. However, those known electric card connectors are usually not compact enough and take relatively large space in electronic devices, conflicting with the current trend of electronic devices toward miniaturization. Thus, the existing electric card connectors disadvantageously impede the electronic devices from being further downsized and thus need to be improved.

SUMMARY OF THE INVENTION

With the attempt to solve the problems of the prior arts, the present invention proposes an electric card connector and a manufacturing method thereof. The electric card connector comprises a base having a plurality of electrically conductive terminals, and a lid having arms formed at two sides thereof for holding an electric card. Pivot parts are provided at the two sides of the lid while hinge parts are formed on the base corresponding to the pivot parts so that when the lid lies on the base, the pivot parts are allowed to slide along the hinge parts without substantial spin. Tenons are formed at front ends of the arms and a latching portion is provided at a front end of the base corresponding to the tenons so that when the lid lies on and slides along the base to engage the tenons with the latching portion, the lid and base are mutually positioned and restricted from relative movement.

Hence, one objective of the present invention is to provide an electric card connector that is compact.

Another objective of the present invention is to provide an electric card connector that allows a user to easily assemble or disassemble an electric card thereto or therefrom.

Another objective of the present invention is to provide an electric card connector with improved durability.

Another objective of the present invention is to provide an electric card connector having a lid whose unfolding angle is restricted.

Still another objective of the present invention is to provide an electric card connector that retains an electric card assembled therein from swaying.

Yet another objective of the present invention is to provide an electric card connector wherein a lid and a base thereof perform relative movement with reduced contact therebetween so that the relative movement is relatively smoother.

BRIEF DESCRIPTION OF THE DRAWINGS

The invention as well as a preferred mode of use, further objectives and advantages thereof will best be understood by reference to the following detailed description of an illustrative embodiment when read in conjunction with the accompanying drawings, wherein.

DETAILED DESCRIPTION OF THE PREFERRED EMBODIMENTS

While the present invention discloses an electric card connector and a manufacturing method of the electric card connector, the principle that the electric card connector operates upon is well known in the art and need not be discussed at length herein. Meanwhile, the accompanying drawings that the following descriptions refer to are provided to illustrate only schematically structures embodying features of the present invention and not necessarily made to scale.

Figure 1:
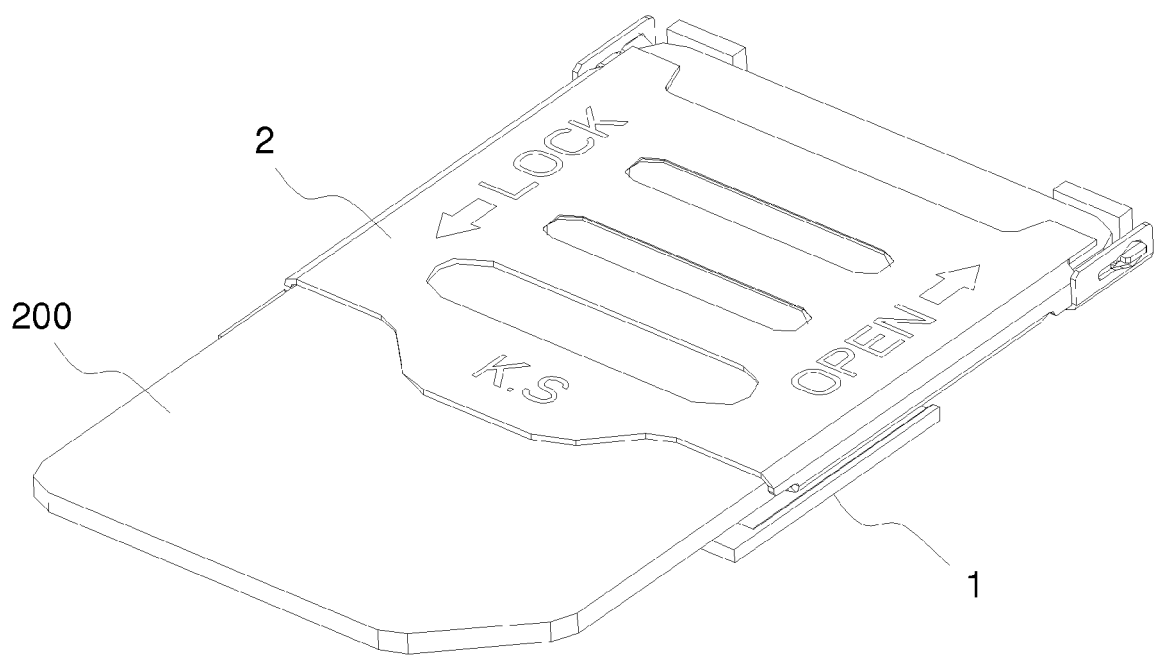
FIG. 1 is a schematic drawing of an electric card connector according to a first embodiment of the present invention, showing an electric card assembled therein.

Please refer to FIG. 1 for an electric card connector 100 according to a first embodiment of the present invention. The electric card connector 100, capable of holding an electric card 200 therein, comprises a base 1 having a plurality of electronically conductive terminals and a lid 2.

Figure 2:
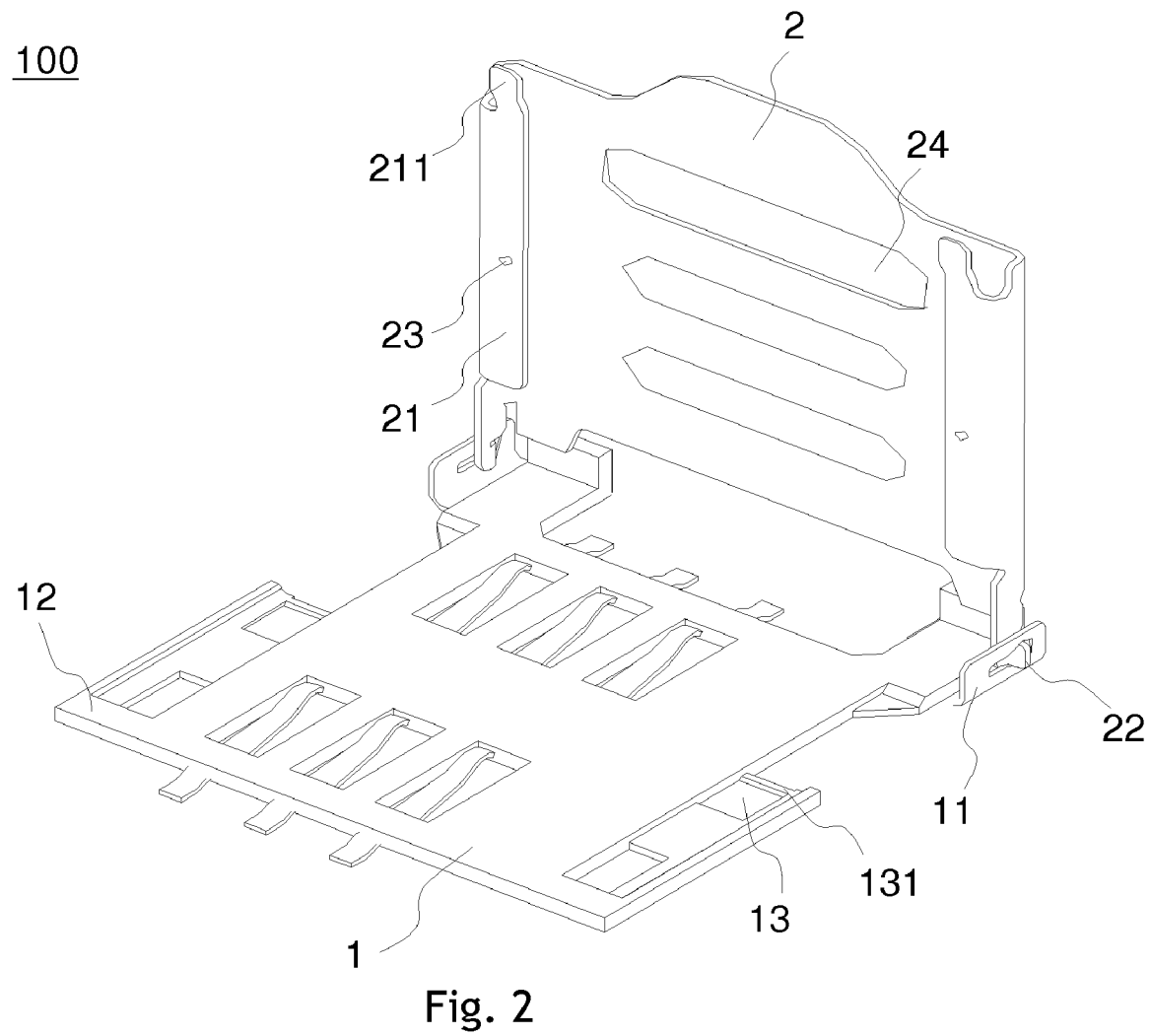
FIG. 2 is a schematic drawing of the electric card connector according to the first embodiment of the present invention, showing the same unfolded.

Reference is now made to FIG. 2, wherein the electric card connector 100 is unfolded. As can be seen in the drawing, the electric card connector 100 comprises the base 1 having a plurality of electronically conductive terminals and the lid 2, wherein the lid 2 has a pair of arms 21 provided at two sides of the lid 2 for holding the aforementioned electric card 200. Two pivot parts 22 are also provided at the two sides of the lid 2 while two hinge parts 11 are arranged at two sides of the base 1 corresponding to the two pivot parts 22, respectively.

Figure 7:
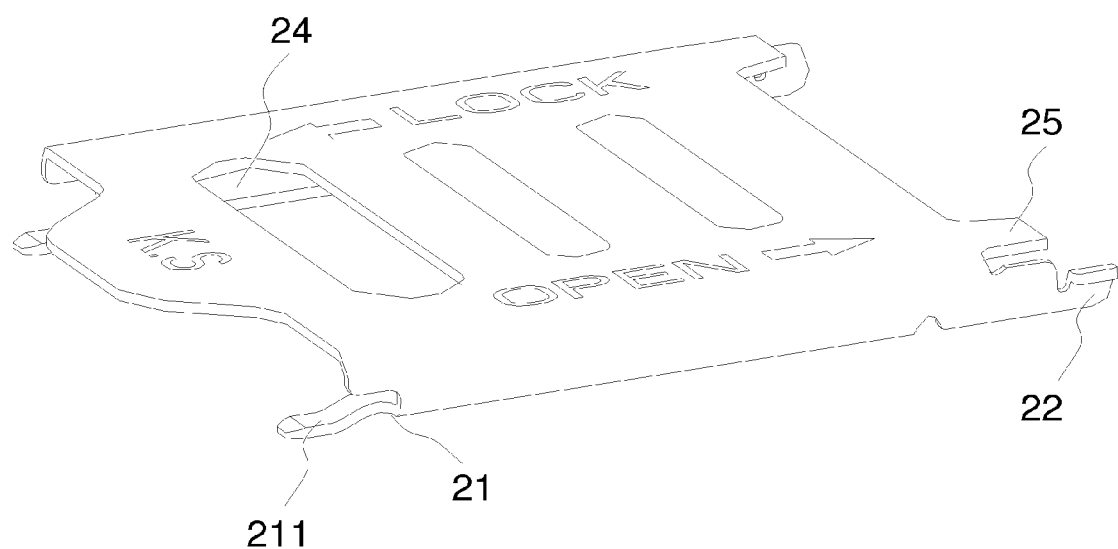
FIG. 7 is a schematic drawing showing a best mode of a lid of the electric card connector according to the first embodiment of the present invention.
Figure 8:
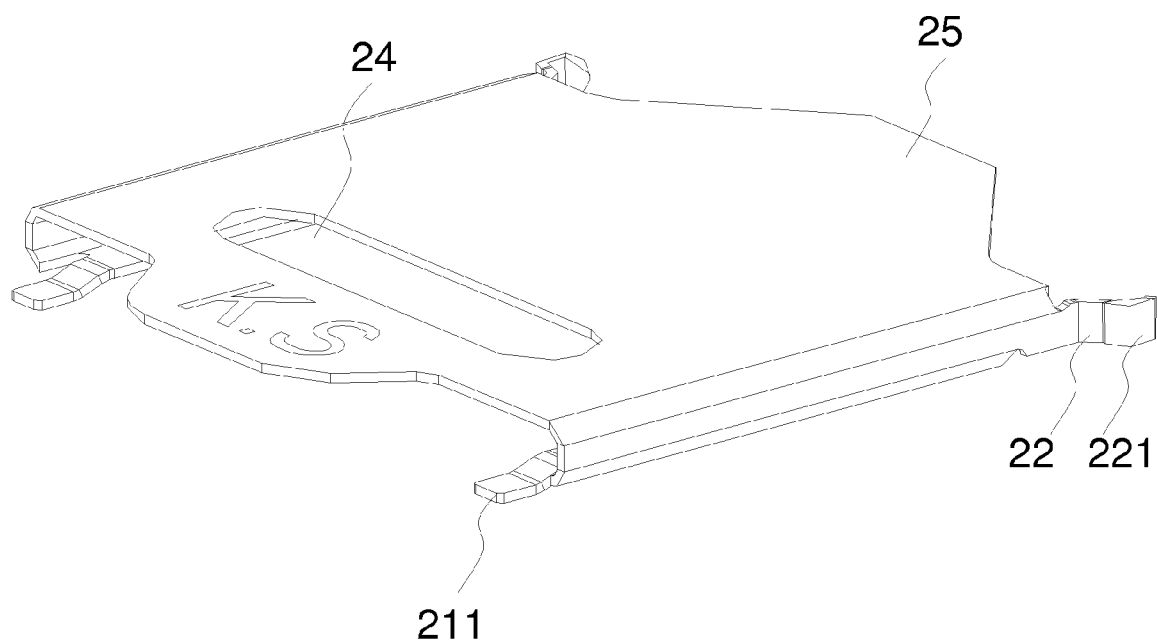
FIG. 8 is a schematic drawing showing another best mode of the lid of the electric card connector according to the first embodiment of the present invention.
Figure 11:
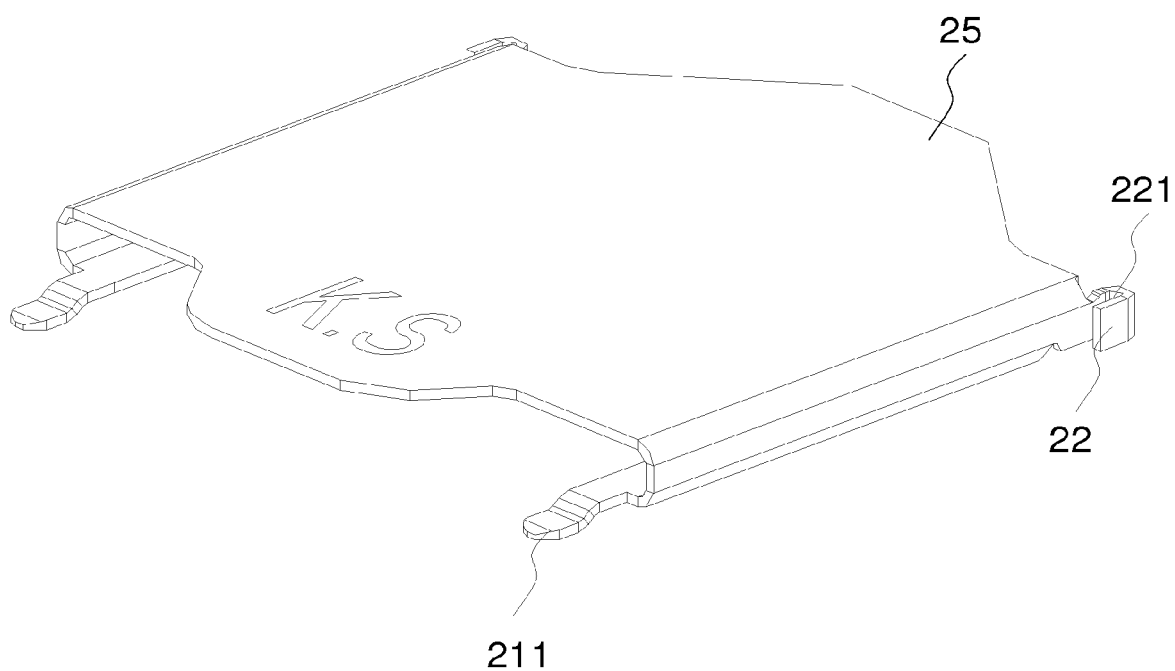
FIG. 11 is a schematic drawing showing another best mode of the lid of the electric card connector according to the first embodiment of the present invention.

Referring to FIG. 7, each pivot part 22 has a non-point-symmetric cross-sectional shape, such as a rectangular shape or other shapes except a round shape. The pivot part 22 shown in FIG. 7 is substantially a short plate in order to minimize a volume of the pivot part 22 and save space. As can be seen in FIG. 8, the pivot part 22 may further have a hook 221 extended therefrom for retaining the pivot part 22 from slipping off a corresponding aperture 111 of the base 1. According to FIGS. 11 and 12, the hook 221 of the pivot part 22 may be alternatively formed into different reflexed shapes so as to achieve better anti-loosing effect.

Referring back to FIG. 2, at lease two buds 23 may be provided at a surface of the lid 2 facing the base 1 so that when the lid 2 lies on and slides along the base 1, the buds 23 of the lid 2 abut against the base 1 and reduce a contacting area between the lid 2 and the base 1, thereby smoothening the sliding movement and protecting the lid 2 from attrition. For structurally reinforcing the lid 2, a reinforcement, such as a rib 24, may be further provided on the lid 2 so as to enhance the moment of inertia of the lid 2 and protect the lid 2 from deformation or deflection under pressure.

Figure 3:
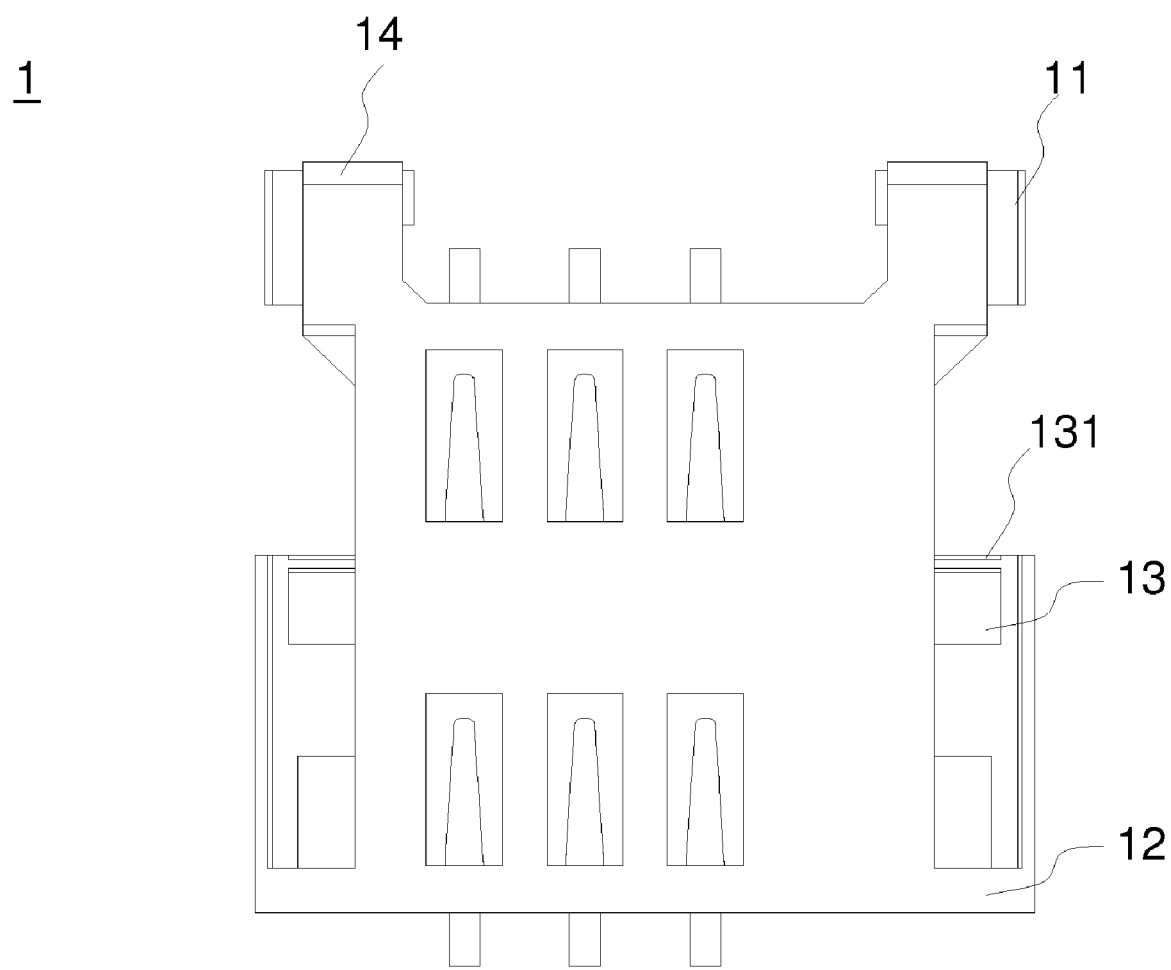
FIG. 3 is a schematic drawing of a base of the electric card connector according to the first embodiment of the present invention.

As shown more clearly in FIG. 3, which is a schematic drawing of the base 1 of the electric card connector 100 according to the first embodiment of the present invention, a latching portion 12 is formed at a front end of a the base 1 corresponding to tenons 211 formed on the lid 2 so that when the lid 2 lies on and slides along the base 1 to an extreme, the tenons 211 of the lid 2 get engaged with the latching portion 12 of the base 1 and are thereby positioned. At this time, the buds 23 of the lid 2 are received by recesses 13 preformed on the base 1. Each recess 13 has an end provided with a blocking portion 131, and movement of the corresponding bud 23 is retained by the blocking portion 131 so that the bud 23 is restricted from reversely coming off so as to further enhance the engagement between the lid 2 and the base 1.

Figure 4A:
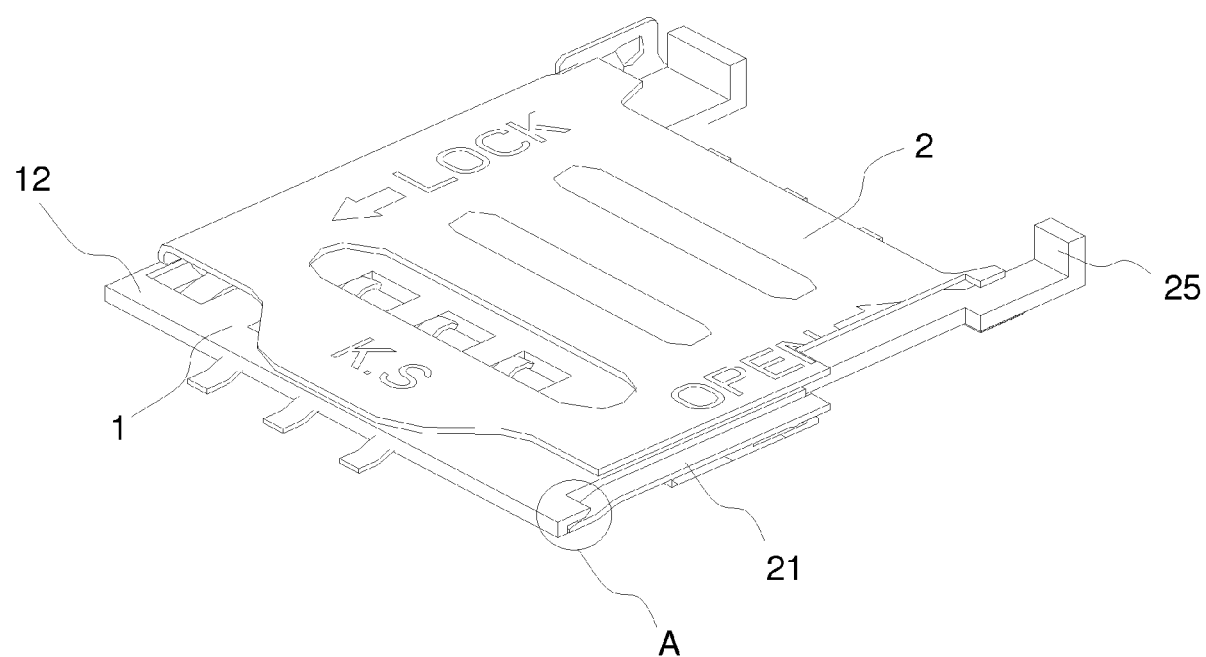
FIG. 4A is a schematic drawing of the electric card connector according to the first embodiment of the present invention, showing the same folded.
Figure 4B:
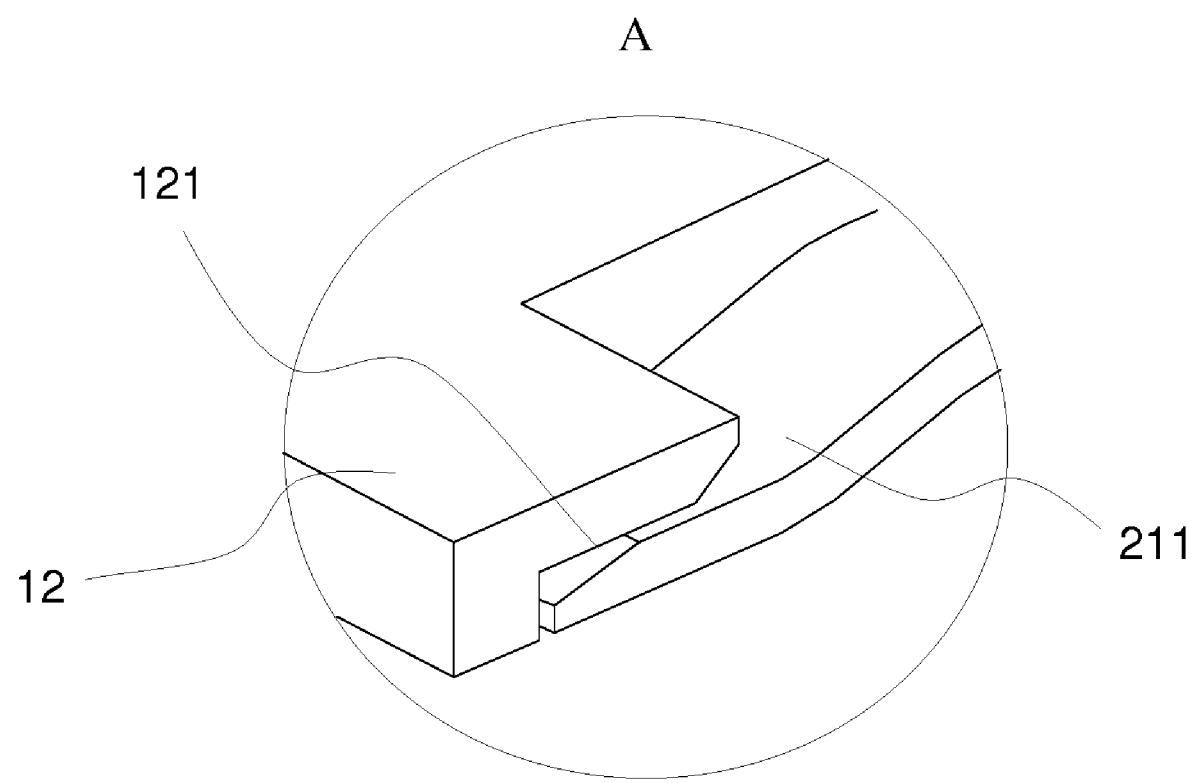
FIG. 4B is a partially enlarged view of an encircled portion A in FIG. 4A.

Seeing FIG. 4A, which is a schematic drawing of the electric card connector 100 according to the first embodiment of the present invention in a folded state, each tenon 211 is formed at a front end of a corresponding arm 21 to match the latching portion 12 of the base 1 so as to prevent the lid 2 and base 1 from relative movement when the lid 2 lies on and slides along the base 1 to the extreme. At this time, if a SIM card is settled in the lid 2, the SIM card is firmly retained in the electric card connector 100. The tenon 211 may be an elongate piece and preferably provided with two bent portions, so as to optimize space utilization. Referring to FIG. 4B for an enlarged view of an encircled portion A in FIG. 4A, a shoulder 121 may be further provided on the latching portion 12 of the base 1 for allowing the tenon 211 to be inserted and retained therein.

Figure 5:
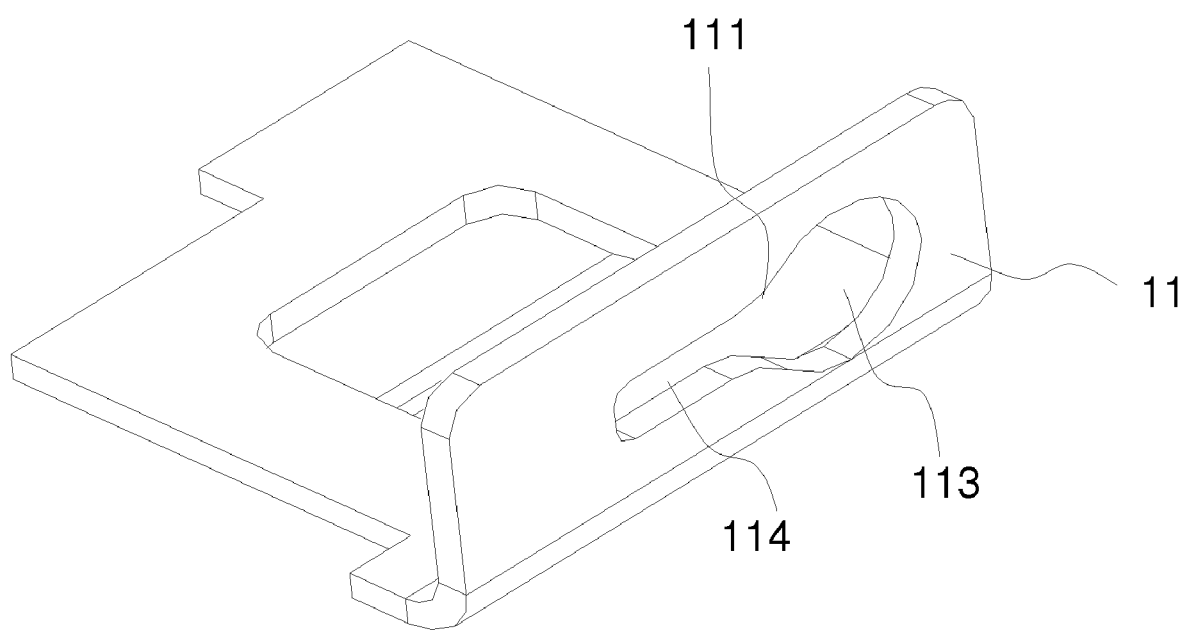
FIG. 5 is a schematic drawing showing a best mode of a hinge part of the electric card connector according to the first embodiment of the present invention.
Figure 9:
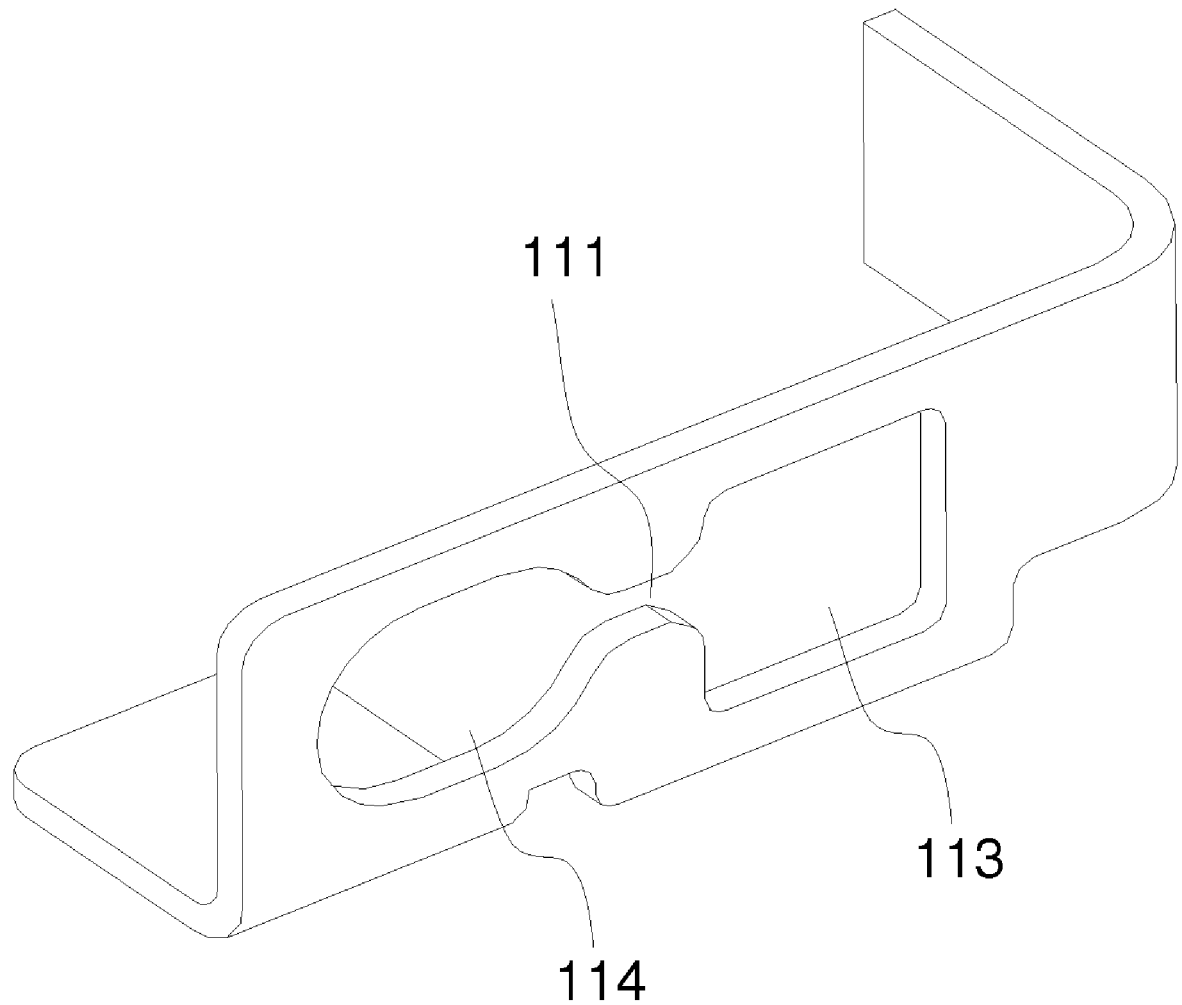
FIG. 9 is a schematic drawing showing another best mode of the pivot part of the electric card connector according to the first embodiment of the present invention.
Figure 10:
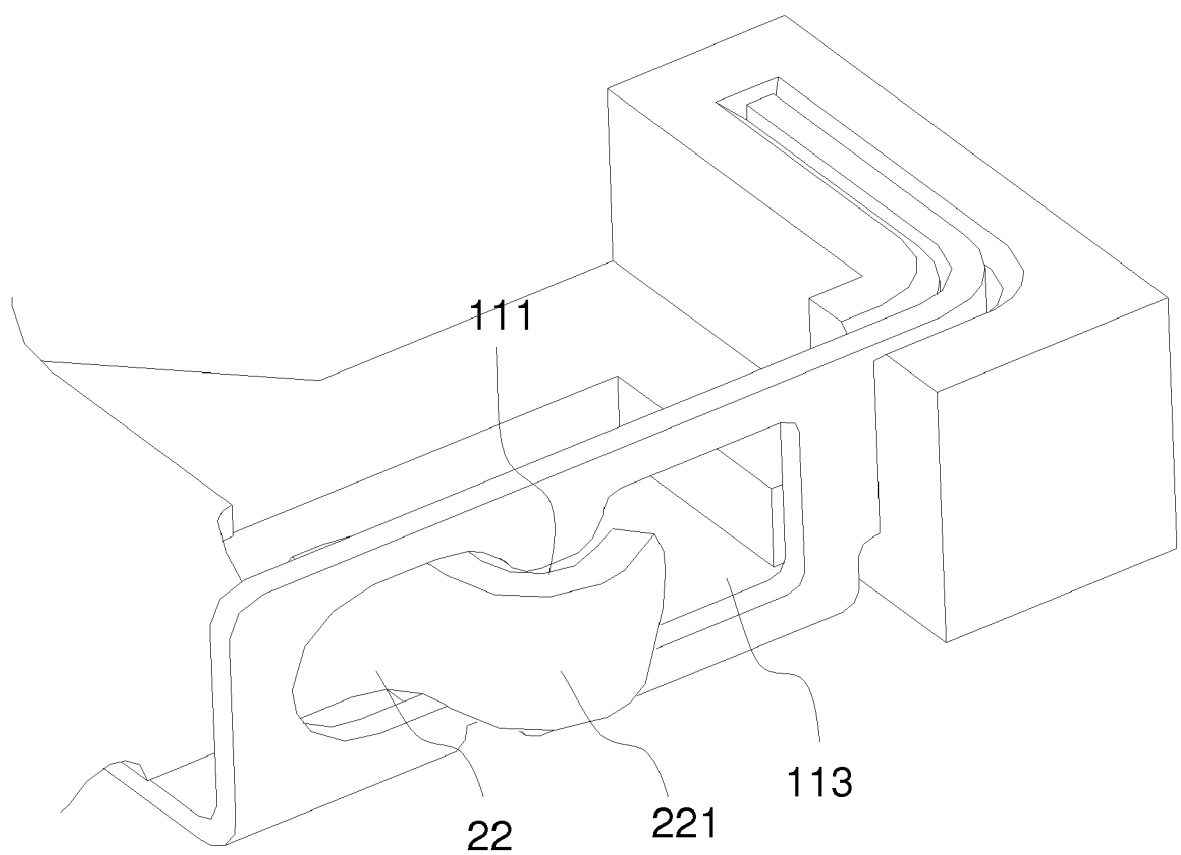
FIG. 10 is a schematic drawing showing another best mode of the engagement between the hinge part and the pivot part of the electric card connector according to the first embodiment of the present invention.
Figure 12:
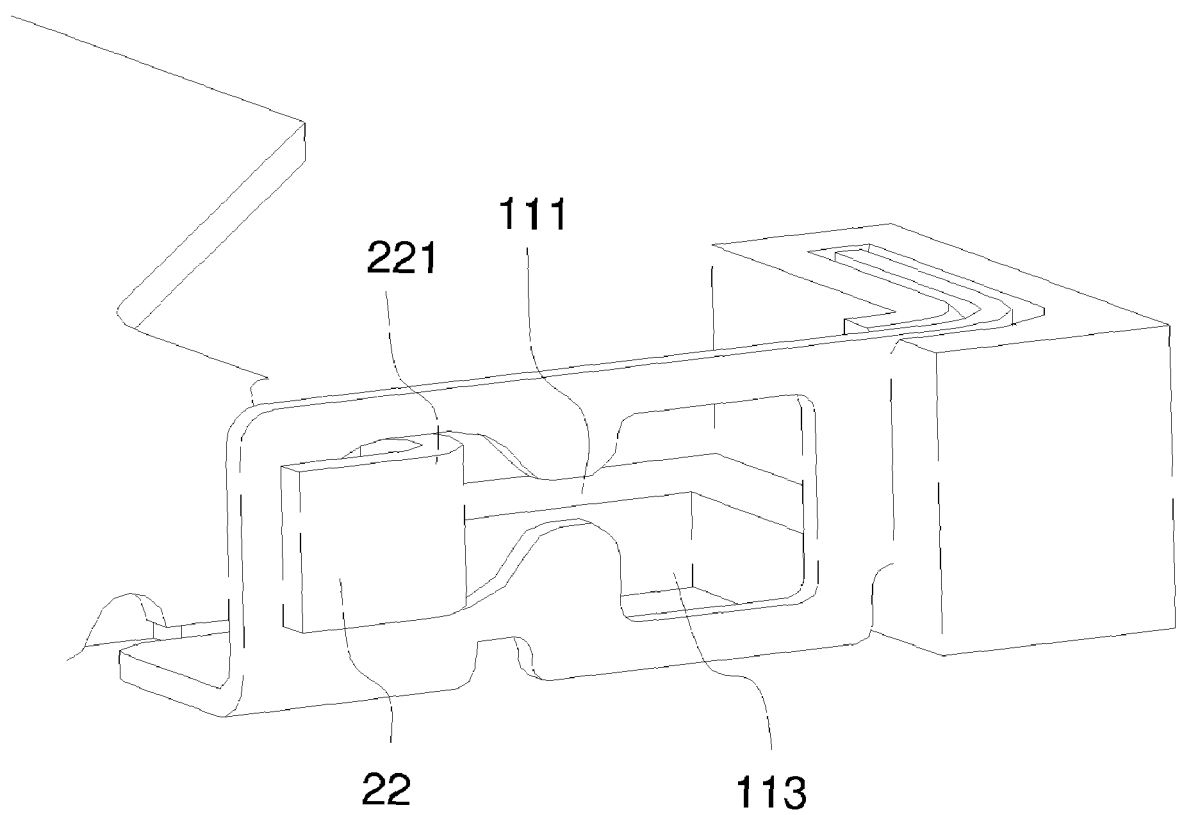
FIG. 12 is a schematic drawing showing yet another best mode of the engagement between the hinge part and the pivot part of the electric card connector according to the first embodiment of the present invention.

FIG. 5 further illustrates a best mode of the hinge parts 11. Each hinge part 11 has the aperture 111 for receiving a corresponding one of the pivot parts 22 pierced therethrough. The aperture 111 includes a swiveling portion 113 and a retaining portion 114. The swiveling portion 113 allows the pivot part 22 to swivel therein. A maximum width of a border where the retaining portion 114 connects the swiveling portion 113 is smaller than a maximum width of the pivot part 22 in a manner that the pivot part 22 is allowed to slide from the swiveling portion 113 to the retaining portion 114 when the lid 2 lies on and slides along the base 1. Though the pivot part 22 oscillates to some extent while sliding, since the width of the border between the retaining portion 114 and the swiveling portion 113 is smaller than the width of the pivot part 22, the retaining portion 114 substantially restricts the pivot part 22 sliding therein from swiveling, so that significant spin of the pivot part 22 is prevented. To achieve smoother sliding movement, the retaining portion 114 of the base 1 may be further formed with an extended configuration parallel to the base 1. The extended configuration may have an elongate shape, as shown in FIG. 5. Moreover, the extended configuration may be a taper shape, as shown in FIG. 9, as long as it restricts the pivot part 22 from significant spin while the pivot part 22 is sliding. The extended configuration not only serves to restrict the pivot part 22 from significant spin while the pivot part 22 is sliding, but also works in cooperation with the hook 221 of the pivot part 22 to prevent the pivot part 22 from coming off the aperture 111 of the base 1, as shown in FIG. 10, thereby enhancing the engagement. The non-point-symmetric cross-sectional shape of the extended configuration may be designed to match the hook 221 in the reflexed shape extended from the of the pivot part 22, as shown in FIG. 12, so as to prevent the pivot part 22 from coming off the aperture 111 of the base 1.

Figure 6:
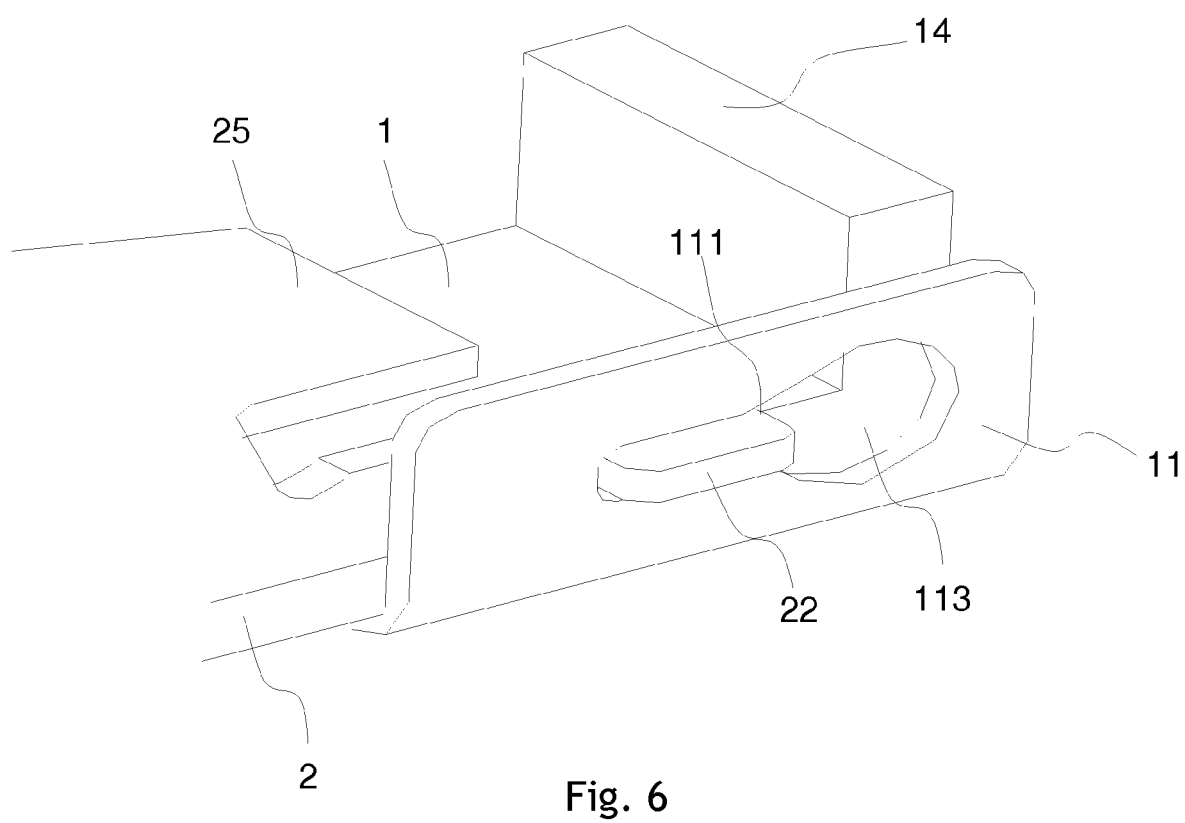
FIG. 6 is a schematic drawing showing a best mode of an engagement between the hinge part of the base and a pivot part of the electric card connector according to the first embodiment of the present invention.

Now please refer to FIG. 6 for a best mode of the engagement between the hinge part 11 of the base 1 and the pivot part 22. A first stopper 14 is further provided at an extreme of the base 1 so that when the pivot part 22 of the lid 2 swivels in the aperture 111 of the hinge part 11 to lift the lid 2 from the base 1, the first stopper 14 serves to retain the lid 2 and restrict an included angle between the lid 2 and the base 1 within 90 degrees. According to FIGS. 7, 8 and 11, a second stopper 25 may be provided at an extreme of the lid 2 so that when the lid 2 is lifted from the base 1, the second stopper 25 serves to retain the base 1 and restrict the included angle between the lid 2 and the base 1 within 90 degrees. As shown in FIG. 7, the second stopper 25 is formed as two arms extended from the lid 2. Alternatively, the second stopper 25 may be formed as a single piece extended from the lid 2, as shown in FIG. 8. Of course, the first stopper 14 of the base 1 and the second stopper 25 of the lid 2 may be provided simultaneously so that when the lid 2 is lifted from the base 1, the first stopper 14 serves to abut against the second stopper 25 and restrict the included angle between the lid 2 and the base 1 within 90 degrees.

In a second embodiment of the present invention, a manufacturing method of an electric card connector is provided, wherein the manufacturing method comprises the steps of:

(1) providing a lid 2 that comprises a pair of arms 21 formed at two sides of the lid 2, respectively, each arm 21 having a tenon 211 at a front end thereof, and comprises a pair of pivot parts 22 formed at the two sides of the lid 2, respectively, each pivot part 22 having a non-point-symmetric cross-sectional shape; and (2) providing a base 1 having a plurality of electrically conductive terminals, a pair of hinge parts 11 formed at two sides of the base 1 corresponding to the pivot parts 22, each hinge part 11 including an aperture 111 that allows a corresponding one of the pivot parts 22 to pierce therethrough and further comprises a swiveling portion 113 and a retaining portion 114, wherein the swiveling portion 113 allows a corresponding one the pivot parts 22 to swivel therein while a maximum width of a border where the retaining portion 114 connects the swiveling portion 113 is smaller than a maximum width of the non-point-symmetric cross-sectional shape of the corresponding pivot part 22 so that when the lid 2 lies on and slides along the base 1, each of the pivot parts 22 is allowed to slide from the swiveling portion 113 to the retaining portion 114 without substantial spin, in which a latching portion 12 is formed at a front end of the base 1 corresponding to the tenons 211 of the arms 21 of the lid 2 so that when the lid 2 lies on and slides along the base 1 to engage the tenons 211 with the latching portion 12, the lid 2 and the base 1 are mutually positioned and restricted from relative movement.

In the present embodiment, all the base 1, lid 2, arms 21, tenons 211, pivot parts 22, hinge parts 11, latching portion 12, apertures 111, swiveling portions 113 and retaining portions 114 share the same characteristics as their counterparts previously described in the first embodiment of the invention.

The present invention has been described with reference to preferred embodiments thereof, which are provided for illustrative purposes only and not intended to limit the scope of the present invention. Moreover, as the contents disclosed herein should be readily understood and can be implemented by a person skilled in the art, all equivalent changes or modifications which do not depart from the spirit of the present invention should be encompassed by the appended claims.

What is claimed is:

1. An electric card connector, comprising a base having a plurality of electrically conductive terminals, and a lid having a pair of arms formed at two sides of the lid for holding an electric card, said electric card connector being characterized by:

two pivot parts provided at the two sides of said lid, respectively, each pivot part having a non-point-symmetric cross-sectional shape;

a pair of hinge parts formed at two sides of said base corresponding to said pivot parts, each said hinge part including an aperture that allows a corresponding one of said pivot parts to pierce therethrough and further comprises a swiveling portion and a retaining portion, wherein said swiveling portion allows the corresponding one of said pivot parts to swivel therein while a maximum width of a border between said retaining portion and said swiveling portion is smaller than a maximum width of the non-point-symmetric cross-sectional shape of the corresponding one of said pivot parts so that when said lid lies on and slides along said base, the corresponding one of said pivot parts is allowed to slide from said swiveling portion to said retaining portion without substantial spin; and a tenon formed at a front end of each of said arms while a latching portion is formed at a front end of said base corresponding to said tenons so that when said lid lies on and slides along said base to engage said tenons with said latching portion, said lid and said base are mutually positioned and restricted from relative movement.

2. The electric card connector of claim 1, wherein each said tenon is an elongate piece, and a shoulder is provided on said latching portion of said base for allowing said tenons to be inserted and retained therein.

3. The electric card connector of claim 1, wherein each said tenon is an elongate piece having a two-stage bent shape.

4. The electric card connector of claim 1, wherein at lease two buds are provided at a surface of said lid facing said base so that when said lid lies on and slides along said base, said buds serve to reduce a contacting area between said lid and said base.

5. The electric card connector of claim 4, wherein recesses are preformed on said base corresponding to said buds on said lid, for receiving said buds when said lid lies on and slides along said base to engage said tenons with said latching portion, so that said buds are retained by said recesses, thereby enhancing an engagement between said lid and said base.

6. The electric card connector of claim 5, wherein each said recess has an end provided with a blocking portion for further restricting a corresponding one of said buds.

7. The electric card connector of claim 1, wherein said retaining portion of said base is formed with an extended configuration parallel to said base.

8. The electric card connector of claim 1, wherein each of said pivot parts further has a hook for preventing each said pivot part from horizontally moving and coming off a corresponding one of said apertures of said base.

9. The electric card connector of claim 1, wherein said lid further has a reinforcement.

10. The electric card connector of claim 1, wherein a first stopper is provided at an extreme of said base so that when said pivot parts of said lid swivel in said apertures of said base, said first stopper serves to retain said lid and restrict an included angle between said lid and said base within 90 degrees.

11. The electric card connector of claim 1, wherein a second stopper is provided at an extreme of said lid so that when said pivot parts of said lid swivel in said apertures of said base, said second stopper serves to retain said base and restrict an included angle between said lid and said base within 90 degrees.

12. The electric card connector of claim 1, wherein a first stopper is provided at an extreme of said base and a second stopper is provided at an extreme of said lid so that when said pivot parts of said lid swivel in said apertures of said base, said first stopper abuts against said second stopper so as to restrict an included angle between said lid and said base within 90 degrees.

13. A manufacturing method of an electric card connector, comprising steps of:

providing a lid that comprises a pair of arms formed at two sides of said lid, respectively, each said arm having a tenon at a front end thereof, and comprises a pair of pivot parts formed at the two sides of said lid, respectively, each said pivot part having a non-point-symmetric cross-sectional shape; and providing a base having a plurality of electrically conductive terminals, a pair of hinge parts formed at two sides of said base corresponding to said pivot parts, each said hinge part including an aperture that allows a corresponding one of said pivot parts to pierce therethrough and further comprises a swiveling portion and a retaining portion, wherein said swiveling portion allows the corresponding one of said pivot parts to swivel therein while a maximum width of a border between said retaining portion and said swiveling portion is smaller than a maximum width of said non-point-symmetric cross-sectional shape of the corresponding one of said pivot parts so that when said lid lies on and slides along said base, the corresponding one of said pivot parts is allowed to slide from said swiveling portion to said retaining portion without substantial spin, in which a latching portion is formed at a front end of said base corresponding to said tenons of said arms of said lid so that when said lid lies on and slides along said base to engage said tenons with said latching portion, said lid and said base are mutually positioned and restricted from relative movement.

14. The manufacturing method of claim 13, wherein each said tenon is an elongate piece, and a shoulder is provided on said latching portion of said base for allowing said tenons to be inserted and retained therein.

15. The manufacturing method of claim 13, wherein at lease two buds are provided at a surface of said lid facing said base so that when said lid lies on and slides along said base, said buds serve to reduce a contacting area between said lid and said base.

16. The manufacturing method of claim 15, wherein recesses are preformed on said base corresponding to said buds on said lid, for receiving said buds when said lid lies on and slides along said base to engage said tenons with said latching portion, so that said buds are retained by said recesses, thereby enhancing an engagement between said lid and said base.

17. The manufacturing method of claim 16, wherein each said recess has an end provided with a blocking portion for further restricting a corresponding one of said buds.

18. The manufacturing method of claim 13, wherein a first stopper is provided at an extreme of said base so that when said pivot parts of said lid swivel in said apertures of said base, said first stopper serves to retain said lid and restrict an included angle between said lid and said base within 90 degrees.

19. The manufacturing method of claim 13, wherein a second stopper is provided at an extreme of said lid so that when said pivot parts of said lid swivel in said aperture of said base, said second stopper serves to retain said base and restrict an included angle between said lid and said base within 90 degrees.

20. The manufacturing method of claim 13, wherein a first stopper is provided at an extreme of said base and a second stopper is provided at an extreme of said lid so that when said pivot parts of said lid swivel in said apertures of said base, said first stopper abuts against said second stopper so as to restrict an included angle between said lid and said base within 90 degrees.

* * * * *